(12) United States Patent
Kim et al.

(10) Patent No.: US 8,848,567 B2
(45) Date of Patent: Sep. 30, 2014

(54) METHOD OF ALLOTTING CARRIER TO STATION

(75) Inventors: Jun Sik Kim, Seoul (KR); Kyong Tak Cho, Daejeon (KR); Byung-Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 49 days.

(21) Appl. No.: 13/562,976

(22) Filed: Jul. 31, 2012

(65) Prior Publication Data

US 2013/0148523 A1 Jun. 13, 2013

(30) Foreign Application Priority Data

Dec. 9, 2011 (KR) .................. 10-2011-0132078

(51) Int. Cl.
*H04L 12/26* (2006.01)
(52) U.S. Cl.
USPC .......................................... 370/252; 370/329
(58) Field of Classification Search
USPC .......................................... 370/323, 329, 252
See application file for complete search history.

(56) References Cited

U.S. PATENT DOCUMENTS

| | | | | |
|---|---|---|---|---|
| 6,175,737 B1 * | 1/2001 | Kao | .............................. | 455/447 |
| 6,690,929 B1 * | 2/2004 | Yeh | .............................. | 455/406 |
| 8,253,613 B2 * | 8/2012 | Holcombe | ..................... | 341/143 |
| 8,417,241 B2 * | 4/2013 | Jha et al. | ........................ | 455/433 |
| 8,437,705 B2 * | 5/2013 | Khoshnevis et al. | ........... | 455/69 |
| 2009/0285143 A1 | 11/2009 | Kwun et al. | | |
| 2009/0310501 A1 * | 12/2009 | Catovic et al. | ................ | 370/252 |
| 2010/0075667 A1 * | 3/2010 | Nakamata et al. | ......... | 455/432.3 |
| 2011/0045836 A1 * | 2/2011 | Hamalainen et al. | ......... | 455/446 |
| 2011/0070881 A1 | 3/2011 | Hwang et al. | | |
| 2013/0003646 A1 * | 1/2013 | Michel et al. | ................. | 370/315 |

FOREIGN PATENT DOCUMENTS

| | | |
|---|---|---|
| KR | 1020090120420 | 11/2009 |
| KR | 1020090120939 | 11/2009 |
| WO | 2009/058068 A1 | 5/2009 |

* cited by examiner

*Primary Examiner* — Andrew Lai
*Assistant Examiner* — Sumitra Ganguly
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is a carrier wave allotting method of an operation and maintenance system in a wireless communication network. The carrier wave allotting method includes searching a wireless resource of the wireless communication network; updating cell information indicating information of cells of the wireless communication network; searching an access mode of a station connected with the operation and maintenance system; searching a wireless capacity of the station; and allotting a carrier wave to the station according to the wireless resource, the cell information, the access mode, and the wireless capacity.

10 Claims, 9 Drawing Sheets

Fig. 8

| CSG ID | Station Identifier | Access Mode | Peripheral Cell Density | CSG Density | Connection Terminal Number | Usable Resource | Load Information Received From Peripheral Cell | Interference Indicator |
|---|---|---|---|---|---|---|---|---|
| | | | | | | | | |
| | | | | | | | | |

METHOD OF ALLOTTING CARRIER TO STATION

CROSS-REFERENCE TO RELATED APPLICATIONS

A claim for priority under 35 U.S.C. §119 is made to Korean Patent Application No. 10-2011-0132078 filed Dec. 9, 2011, in the Korean Intellectual Property Office, the entire contents of which are hereby incorporated by reference.

BACKGROUND

The inventive concepts described herein relate to wireless communication, and more particularly, relate to a method of allotting a carrier wave to a station.

A wireless mobile network may provide a seamless wireless communication service to a wireless communication terminal having mobility. The wireless mobile network may be formed of a plurality of stations.

Each station may operate one cell. A station may perform wireless communication with a wireless communication terminal placed within a corresponding cell. When a wireless communication terminal moves from one cell (e.g., a source cell) into another cell (e.g., a target cell), a station of the target cell may establish communication with a wireless communication terminal, and a station of the source cell may terminate communication with the wireless communication terminal. This operation may be referred to as a handover (HO). The handover may enable the wireless mobile network to provide a seamless wireless communication service to a wireless communication terminal.

Commercialized wireless mobile networks may include GSM (Global System for Mobile communication), CDMA (Code Division Multiple Access), WCDMA (Wideband CDMA), CDMA 2000, WiMAX (World interoperability for Microwave Access), LTE (Long Term Evolution), and the like.

The interference may arise at the wireless mobile network. For example, radio waves transmitted and received by stations of adjacent cells may mutually interfere. Alternatively, in case of a closed subscriber group (CSG) that a specific station provides a wireless communication service to certified wireless communication terminals, when an uncertified wireless communication terminal enters the specific station, it may be provided with a wireless communication service from a faraway station, not the station the cell of which the uncertified wireless communication terminal enters. At this time, a radio wave transmitted and received by the specific station may affect wireless transmission and reception between the uncertified wireless communication terminal and the faraway station.

SUMMARY

One aspect of embodiments of the inventive concept is directed to provide a carrier wave allotting method of an operation and maintenance system in a wireless communication network. The carrier wave allotting method comprises searching a wireless resource of the wireless communication network; updating cell information indicating information of cells of the wireless communication network; searching an access mode of a station connected with the operation and maintenance system; searching a wireless capacity of the station; and allotting a carrier wave to the station according to the wireless resource, the cell information, the access mode, and the wireless capacity.

In example embodiments, the updating cell information indicating information of cells of the wireless communication network is performed when the station is connected or periodically although the station is not connected.

In example embodiments, the updating cell information indicating information of cells of the wireless communication network comprises updating an interference indicator indicating interference between cells.

In example embodiments, the searching an access mode of a station connected with the operation and maintenance system comprises judging whether the station is at an open access mode, a hybrid access mode, or a closed subscriber group mode.

In example embodiments, the allotting a carrier wave to the station according to the wireless resource, the cell information, the access mode, and the wireless capacity comprises allotting a dedicated carrier wave not sharing a carrier wave with another cell, a partially sharing carrier wave partially sharing a carrier wave with another cell, or a sharing carrier wave sharing a carrier wave with another cell, to the station.

In example embodiments, when the station is at the closed subscriber group mode, the dedicated carrier wave is allotted to the station in preference to the partially sharing carrier wave or the sharing carrier wave and the partially sharing carrier wave is allotted to the station in preference to the sharing carrier wave.

In example embodiments, when the station is at an open access mode or a hybrid access mode, a carrier wave is allotted to the station according to the wireless resource, the cell information, the access mode, and the wireless capacity.

In example embodiments, the updating cell information indicating information of cells of the wireless communication network comprises generating first cell information and establishing a first weight using an interface existing between stations of the wireless communication network; generating second cell information and establishing a second weight using a downlink receiver existing at the stations of the wireless communication network; and generating third cell information and establishing a third weight using a channel quality indicator.

In example embodiments, the generating second cell information and establishing a second weight using a downlink receiver existing at the stations of the wireless communication network comprises calculating a reference signal received power (RSRP) and a reference signal received quality (RSRQ); calculating a variation in the RSRP to the RSRQ; and establishing the second weight according to a deviation of an RSRQ-based RSRP deviation.

In example embodiments, the generating third cell information and establishing a third weight using a channel quality indicator comprises receiving the channel quality indicator (CQI); calculating a variation in a the channel quality indicator to an average of the channel quality indicator; and establishing the third weight according to a deviation of a variation in the channel quality indicator based on the average of the channel quality indicator.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 8 is a diagram illustrating a resource management table of an operation and maintenance system.

DETAILED DESCRIPTION

Figure 1:
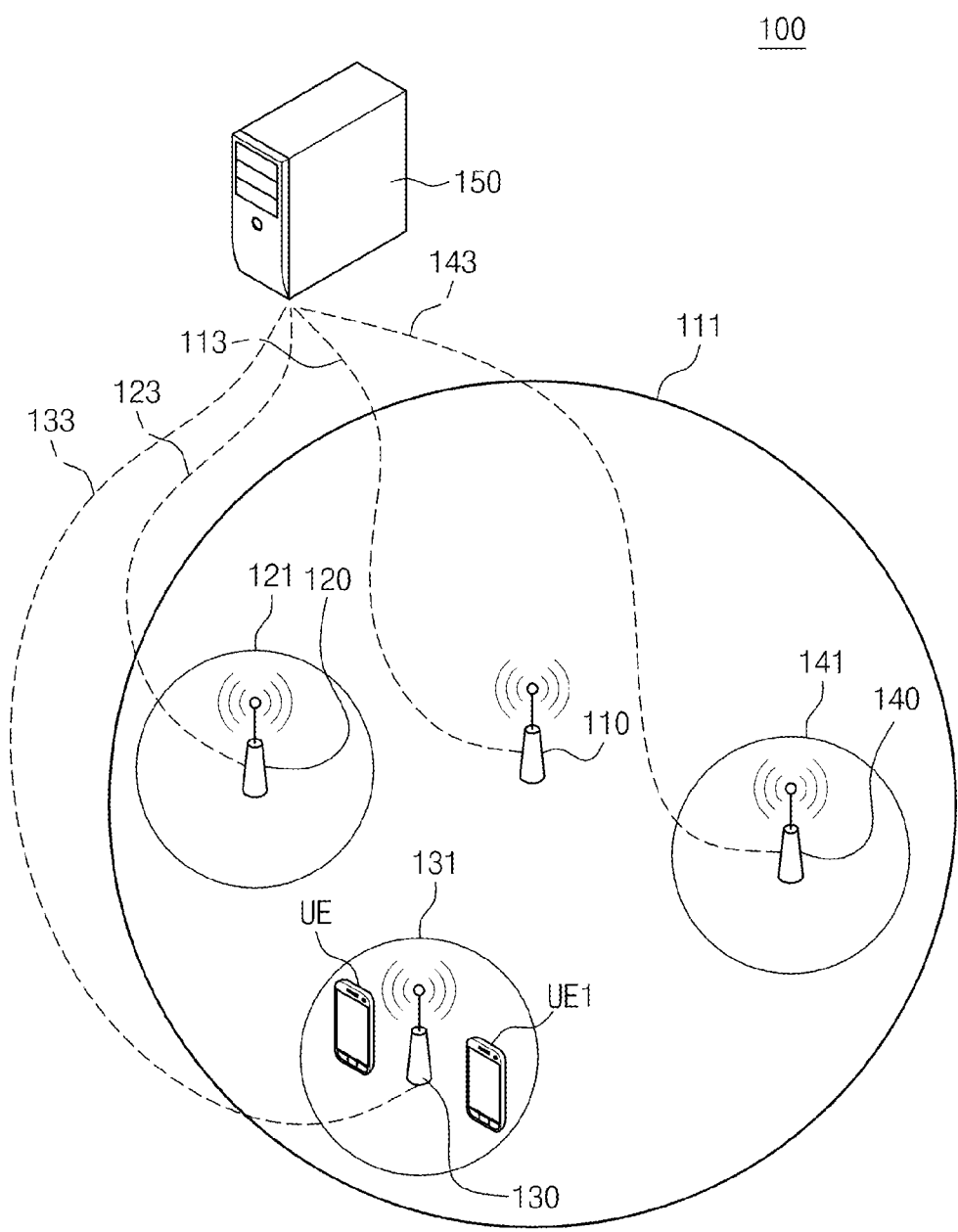
FIG. 1 is a diagram schematically illustrating a wireless communication network according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram schematically illustrating a wireless communication network according to an embodiment of the inventive concept. Referring to FIG. 1, a wireless communication network 100 may include stations 110, 120, 130, and 140 and an operation and maintenance system 150.

The stations 110, 120, 130, and 140 may perform wireless transmission and reception with the user equipment UE1 and UE2. The stations 110, 120, 130, and 140 may form cells 111, 121, 131, and 141, respectively. The station 110 may form a cell wider than other stations 120, 130, and 140. For example, the cell 111 formed by the station 110 may be a macro cell. The cells 121, 131, and 141 formed by the stations 120, 130, and 140 may be pico cells or femto cells. That is, the wireless communication network 100 may form a heterogeneous network (HetNet).

The stations 110, 120, 130, and 140 may be connected to the operation and maintenance system 150 through cables 113, 123, 133, and 143, respectively. The cables 113, 123, 133, and 143 may be optical or internet cables.

The operation and maintenance system 150 may control and manage the stations 110, 120, 130, and 140. The operation and maintenance system 150 may allot carrier waves to the stations 110, 120, 130, and 140. The operation and maintenance system 150 may allot the same carrier waves to the stations 110, 120, 130, and 140. The operation and maintenance system 150 may partition usable carrier waves to carrier components to allot one or more carrier components to each of the stations 110, 120, 130, and 140. That is, the operation and maintenance system 150 may allot carrier waves to the stations 110, 120, 130, and 140 based on carrier aggregation.

Each of the stations 110, 120, 130, and 140 may have an open access mode, a closed subscriber group (CSG) mode, or a hybrid access mode.

In a cell of a station having the open access mode, the user equipment UE1 and UE2 may be provided with a wireless communication service without limitation.

In a cell of a station having the closed subscriber group mode, the user equipment having authority from among the user equipment UE1 and UE2 may be provided with a wireless communication service, and the user equipment having no authority may not be provided with the wireless communication service.

In a cell of a station having the hybrid access mode, the user equipment having authority from among the user equipment UE1 and UE2 may be provided with a wireless communication service having the priority. The user equipment having no authority may not be provided with the wireless communication service to which the priority is not granted.

In example embodiments, the station 130 may have the closed subscriber group mode, the user equipment UE1 may have authority for communication with the station 130, and the user equipment UE2 may not have authority for communication with the station 130. The station 110 may have the open access mode or the hybrid access mode.

The user equipment UE1 having the authority may perform wireless communication through the station 130. The user equipment UE2 having no authority may not perform wireless communication through the station 130. The user equipment UE2 having no authority may perform wireless communication with the faraway station 110, not the close station 130. When the stations 110 and 130 use the same carrier waves, communication between the station 130 and the user equipment UE1 and a broadcasting message transmitted from the station 130 may affect communication between the user equipment UE2 and the station 110. Besides, when stations (e.g., 120 and 140) adjacent to the station 130 uses the same carrier waves as the station 130, communication and broadcasting message of the respective stations 120 and 140 may affect communication between the user equipment UE2 and the station 110.

To prevent the above-described problems, the operation and maintenance system 150 may allot carrier waves of the stations 110 to 140 such that the interference of the wireless communication network 100 is minimized.

Figure 2:
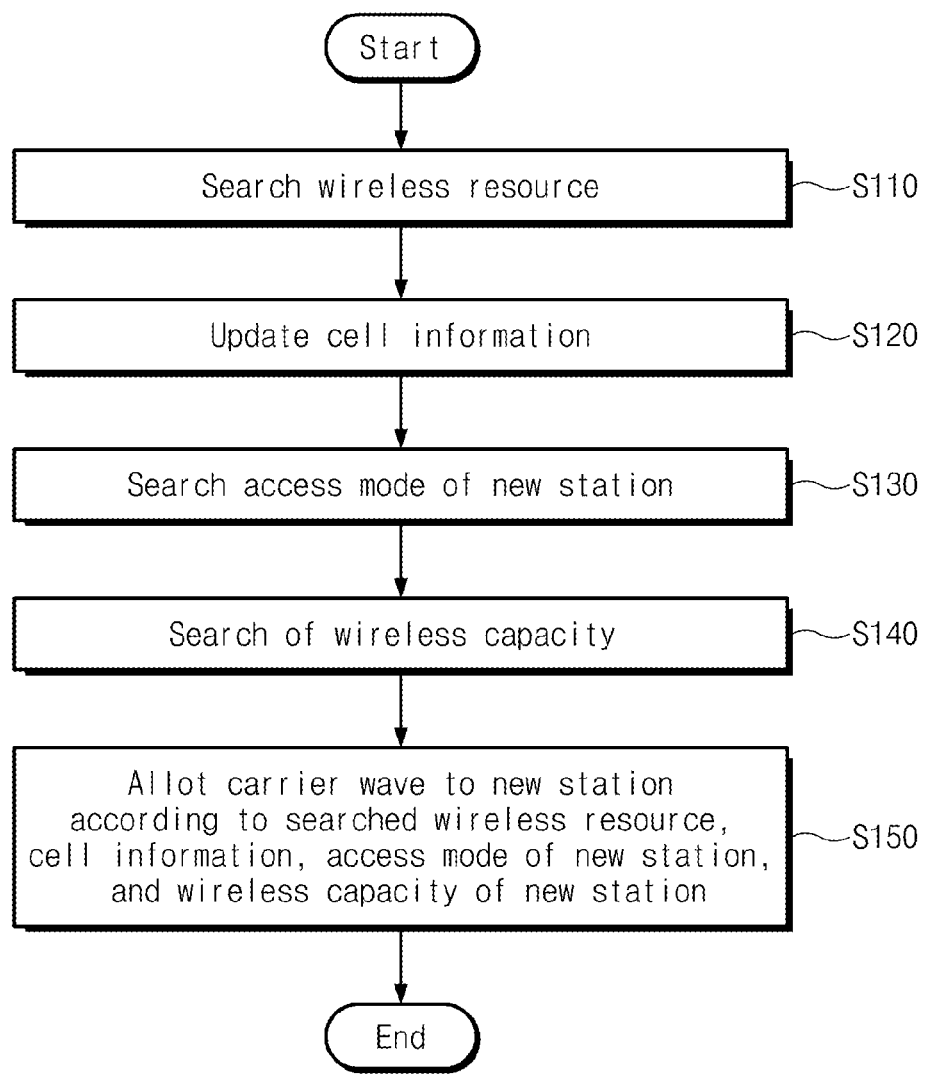
FIG. 2 is a flowchart illustrating a method of allotting a carrier wave to a new station when the new station is connected with a wireless communication network.

FIG. 2 is a flowchart illustrating a method of allotting a carrier wave to a new station when the new station is connected with a wireless communication network.

Referring FIGS. 1 and 2, in operation S110, an operation and maintenance system 150 may search a wireless resource. The operation and maintenance system 150 may search all wireless resources of a wireless communication network 100. The operation and maintenance system 150 may search occupied and spare wireless resources of the wireless communication network 100. The operation and maintenance system 150 may search common carrier waves, partially common carrier waves, dedicated carrier waves, and unused carrier waves. The operation and maintenance system 150 may search an occupied wireless capacity and an unused wireless capacity.

In operation S120, the operation and maintenance system 150 may update cell information. The cell information may indicate an interference indicator indicating the interference generated at cells 111, 121, 131, and 141. Updating of the cell information will be more fully described with reference to FIG. 4.

In operation S130, the operation and maintenance system 150 may search an access mode of a new station. For example, the operation and maintenance system 150 may judge whether the new station has an open access mode, a hybrid access mode, or a closed subscriber group mode.

In operation S140, the operation and maintenance system 150 may search a wireless capacity of the new station. The operation and maintenance system 150 may search a wireless capacity to be used at the new station.

In operation S150, the operation and maintenance system 150 may allot a carrier wave to the new station according to the searched wireless resource, the cell information, the access mode of the new station, and the wireless capacity of the new station. The operation and maintenance system 150 may allot a common carrier wave, a partially common carrier wave, or a dedicated carrier wave to the new station. Allotment of the carrier wave will be more fully described with reference to FIG. 7.

Figure 3:
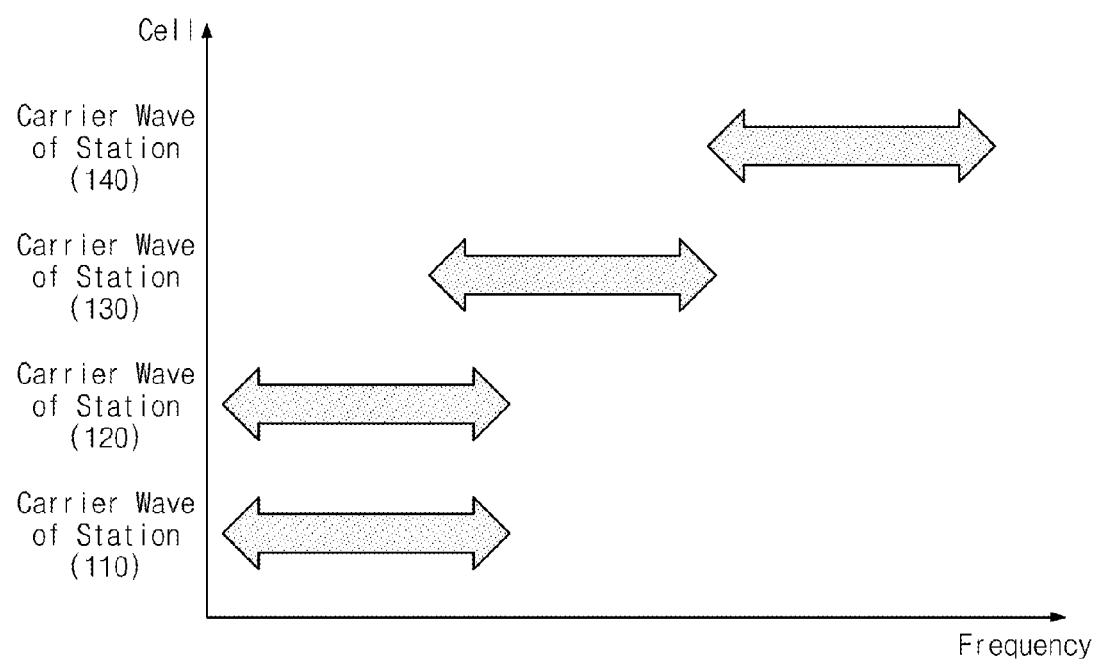
FIG. 3 is a diagram illustrating exemplary carrier waves allotted to stations of a wireless communication network.

FIG. 3 is a diagram illustrating exemplary carrier waves allotted to stations of a wireless communication network. Referring to FIGS. 1 and 3, a carrier wave of a station 110 may be equal to that of a station 120. That is, carrier waves of the stations 110 and 120 may be a common carrier wave.

A portion of a carrier wave of a station 130 may be overlapped with the carrier waves of the stations 110 and 120, and the remaining thereof may not be overlapped with carrier waves of other stations 110, 120, and 130. That is, the carrier wave of the station 130 may be a partially common carrier wave.

A carrier wave of a station 140 may not be overlapped with carrier waves of other stations 110, 120, and 130. That is, the carrier wave of the station 140 may be a dedicated carrier wave.

Figure 4:
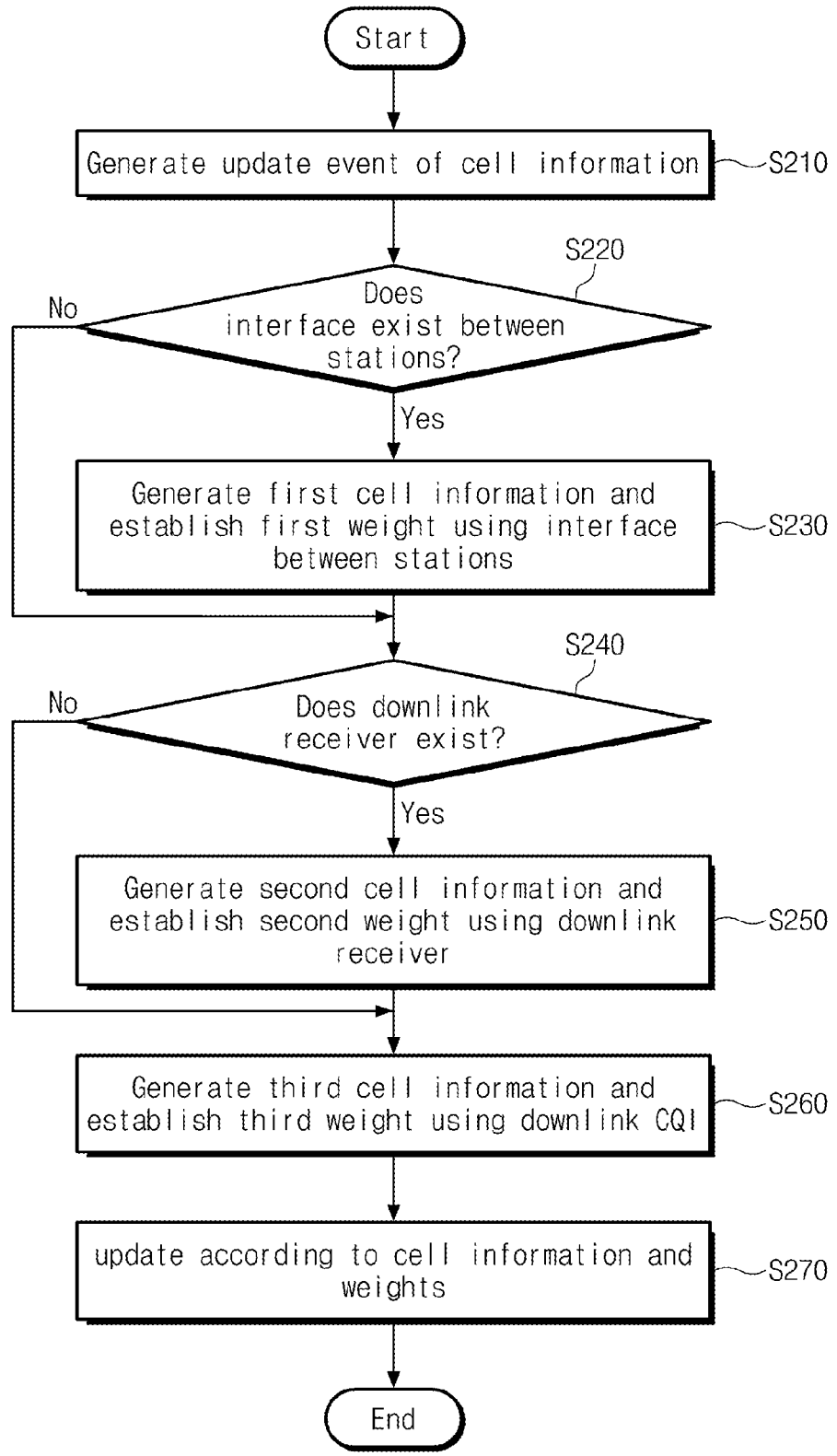
FIG. 4 is a flowchart illustrating a method of updating cell information.

FIG. 4 is a flowchart illustrating a method of updating cell information.

Referring to FIGS. 1 and 4, in operation S210, an update event associated with cell information may be generated. For example, the update event may be generated when a new station is added to a wireless communication network 100. Although a new station is not added to the wireless communication network 100, the update event can be generated.

In operation S220, an operation and maintenance system 150 may judge whether an interface exists between stations. For example, the operation and maintenance system 150 may an X2 interface for communication between stations exists at stations 110 to 140.

If an interface exists between stations, in operation S230, the operation and maintenance system 150 may establish first cell information and a first weight using an inter-station interface. For example, the operation and maintenance system 150 may collect interference information among cells 111, 121, 131, and 141 by controlling the stations 110 to 140 so as to perform a load reporting operation for exchanging load information.

The first weight may indicate a weight of the first cell information among collected cell information. The first cell information may be interference information directly collected from the stations 110 to 140 through the load reporting operation. The first cell information may have information, having the highest accuracy, from among information indicating interference between the cells 111 to 141. Thus, the first weight may have a weight larger than other cell information.

In example embodiments, ones of the stations 110 to 140 may have an inter-station interface, and the remaining thereof may not have an inter-station interface. In this case, the operation and maintenance system 150 may perform generating of the first cell information and establishing of the first weight with respect to the stations having the inter-station interface.

After the generating of the first cell information and establishing of the first weight are completed, or when no inter-station interface exists, the method proceeds to operation S240, in which the operation and maintenance system 150 judges whether downlink receivers exist. The operation and maintenance system 150 may judge whether the stations 110 to 140 have the downlink receivers.

When the downlink receivers exist, in operation S250, in operation S250, the operation and maintenance system 150 may generate second cell information and establish a second weight using the downlink receiver. For example, the operation and maintenance system 150 may control the stations 110 to 140 to measure interference using downlink receivers.

The second cell information may be generated according to results obtained by measuring states of the cells 111 to 141 using the downlink receivers. The accuracy of interference indicated by the second cell information may be lower than that indicated by the first cell information. The second weight associated with the second cell information may be set to be smaller than the first weight associated with the first cell information.

In example embodiments, ones of the stations 110 to 140 may have downlink receivers, and the remaining thereof may not have downlink receivers. In this case, the operation and maintenance system 150 may perform generating of the second cell information and establishing of the second weight with respect to the stations having the downlink receiver.

Generation of the second cell information and establishment of the second weight using the downlink receiver will be more fully described with reference to FIG. 5.

After the generation of the second cell information and establishment of the second weight are completed, or when the stations 110 to 140 don't have the downlink receivers, the method proceeds to operation S260, in which the operation and maintenance system 150 may make generation of third cell information and establishment of a third weight using a channel quality indicator (CQI). The operation and maintenance system 150 may control the stations 110 to 140 to receive the channel quality indicator CQI from the user equipment UE1 and UE2 and to transmit them. The operation and maintenance system 150 may make generation of the third cell information and establishment of the third weight using the channel quality indicator (CQI).

The third cell information may be generated according a result that the stations 110 to 140 receive states of cells 111 to 141 indirectly measured by the user equipment UE1 and UE2. The accuracy of interference indicated by the third cell information may be lower than that indicated by the second cell information. The third weight associated with the third cell information may be set to be smaller than the second weight associated with the second cell information.

Generation of the third cell information and establishment of the third weight using the channel quality indicator (CQI) will be more fully described with reference to FIG. 6.

In operation S270, the operation and maintenance system 150 may update cell information according to the cell information and weights. The cell information may indicate whether interference of any one of usable carrier waves is serious, interference of any carrier wave is small, and correlation between interference of a carrier wave and locations of the stations 110 to 140. That is, the cell information may indicate whether or not interference of any carrier wave is serious at any location and whether or not interference of any carrier wave is serious at another location. The operation and maintenance system 150 may check whether or not interference of any carrier wave is serious at any location, based on the cell information.

Figure 5:
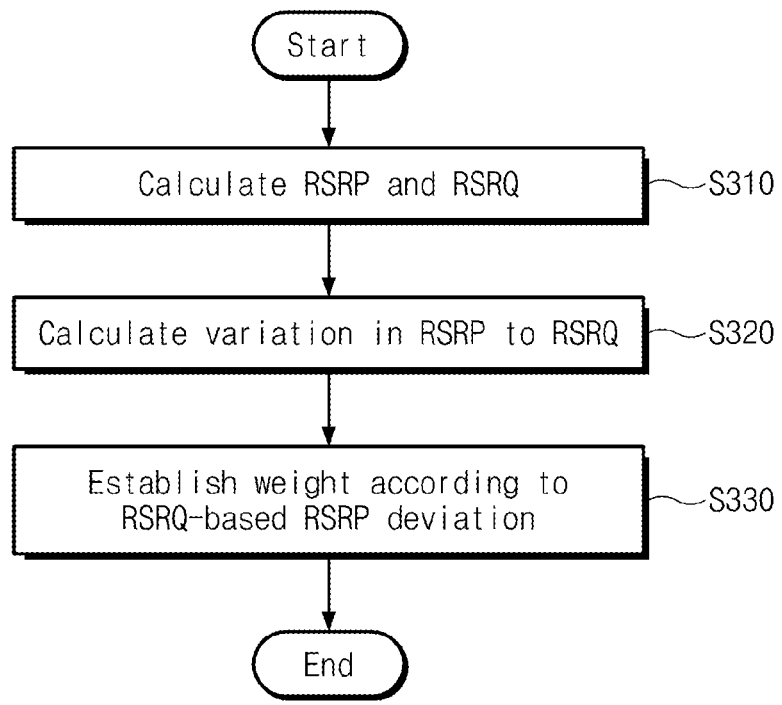
FIG. 5 is a flowchart illustrating a method of generating second cell information and establishing a second weight.

FIG. 5 is a flowchart illustrating a method of generating second cell information and establishing a second weight. Referring to FIGS. 1 and 5, in operation S310, a reference signal received power (RSRP) and a reference signal received quality (RSRQ) may be calculated. An operation and maintenance system 150 may control stations 110, 120, 130, and 140 to measure the reference signal received power through downlink receivers. The stations 110 to 140 may calculate a reference signal received quality (RSRQ) based on the measured the reference signal received power. The reference signal received quality may indicate a ratio of the RSRP to a received signal strength indicator (RSSI) indicating the whole strength of a signal received through a downlink receiver.

In operation S320, a variation in the RSRP to the RSRQ may be calculated. For example, if the RSRP indicating the strength of a reference signal at a specific station is constant and the RSRQ indicating the quality of the reference signal is reduced, interference of the specific station may be judged to increase. Likewise, if the RSRP of the specific station is constant and the RSRQ increases, interference of the specific station may be judged to decrease. In the case that the RSRQ of the specific station is constant and the RSRP increases, interference of the specific station may be judged to increase. When the RSRQ of the specific station is constant and the RSRP decreases, interference of the specific station may be judged to decrease. If a variation in the RSRQ to the RSRP is calculated, interference of the stations 110 to 140 may be measured. The measured interference may be second cell information.

The operation and maintenance system 150 may receive the RSRP and RSRQ from the stations 110 to 140 to calculate a variation in the RSRP to the RSRQ. Alternatively, the stations 110 to 140 may calculate a variation in the RSRP to the RSRQ to send it to the operation and maintenance system 150.

In operation S330, the operation and maintenance system 150 may establish a weight according to an RSRQ-based RSRP deviation. For example, if an RSRQ-based RSRP deviation is large, a large or small weight may be established. On the other hand, if an RSRQ-based RSRP deviation is small, a large or small weight may be established. A weight establishing method may be adjusted and applied according to an operating algorithm of the operation and maintenance system 150 and characteristics of the stations 110 to 140.

Figure 6:
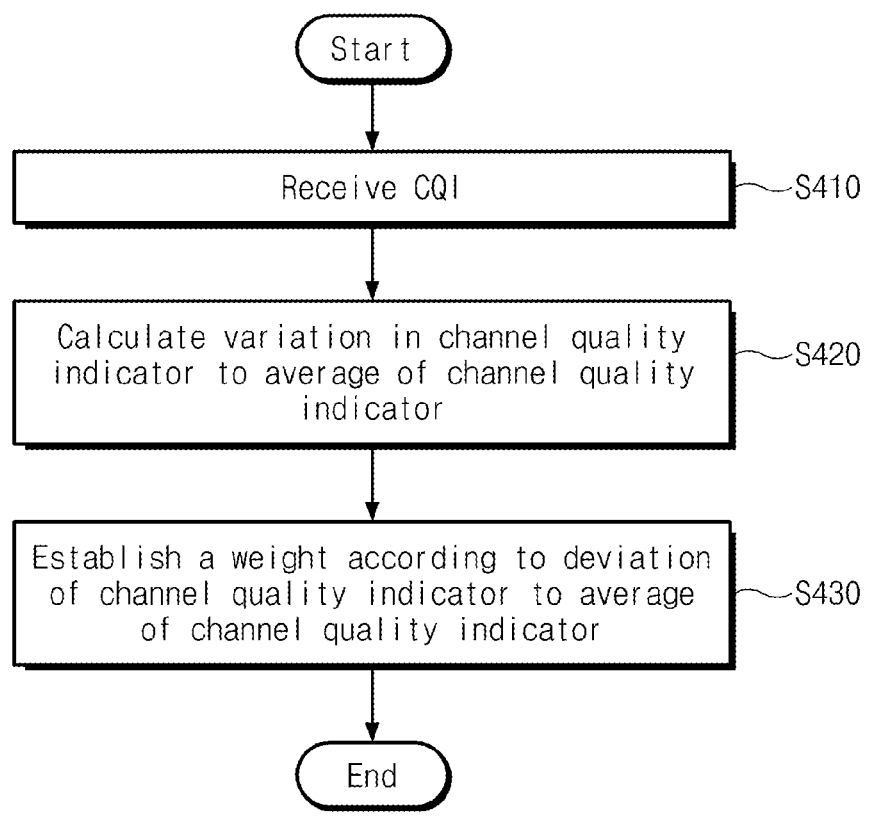
FIG. 6 is a flowchart illustrating a method of generating third cell information and establishing a third weight.

FIG. 6 is a flowchart illustrating a method of generating third cell information and establishing a third weight. Referring to FIGS. 1 and 6, in operation S410, a channel quality indicator CQI may be received. Stations 110, 120, 130, and 140 can periodically receive the channel quality indicator CQI from the user equipment UE1 and UE2.

In operation S420, a variation in the channel quality indicator CQI to an average of the channel quality indicator CQI may be calculated. An operation and maintenance system 150 may receive the channel quality indicator CQI from the stations 110, 120, 130, and 140, calculate an average of the channel quality indicator CQI, and measure a deviation between the channel quality indicator CQI and the calculated average by a sub-frame unit. Alternatively, the stations 110 to 140 may calculate an average of the channel quality indicator CQI and measure a deviation between the channel quality indicator CQI and the calculated average by a sub-frame unit. The stations 110 to 140 may send the measured deviation to the operation and maintenance system 150.

When the channel quality indicator CQI is smaller than the calculated average, interference of a corresponding station may be judged to increase. When the channel quality indicator CQI is larger than the calculated average, interference of a corresponding station may be judged to decrease. If a deviation of the channel quality indicator CQI to the calculated average is measured, interference of the stations 110 to 140 may be measured. The measured interference may be third cell information.

In operation S430, the operation and maintenance system 150 may establish a weight according to a deviation of the channel quality indicator CQI to the calculated average. For example, if a deviation of the channel quality indicator CQI to the calculated average is large, a large or small weight may be established. On the other hand, if a deviation of the channel quality indicator CQI to the calculated average is small, a large or small weight may be established. A weight establishing method may be adjusted and applied according to an operating algorithm of the operation and maintenance system 150 and characteristics of the stations 110 to 140.

Figure 7:
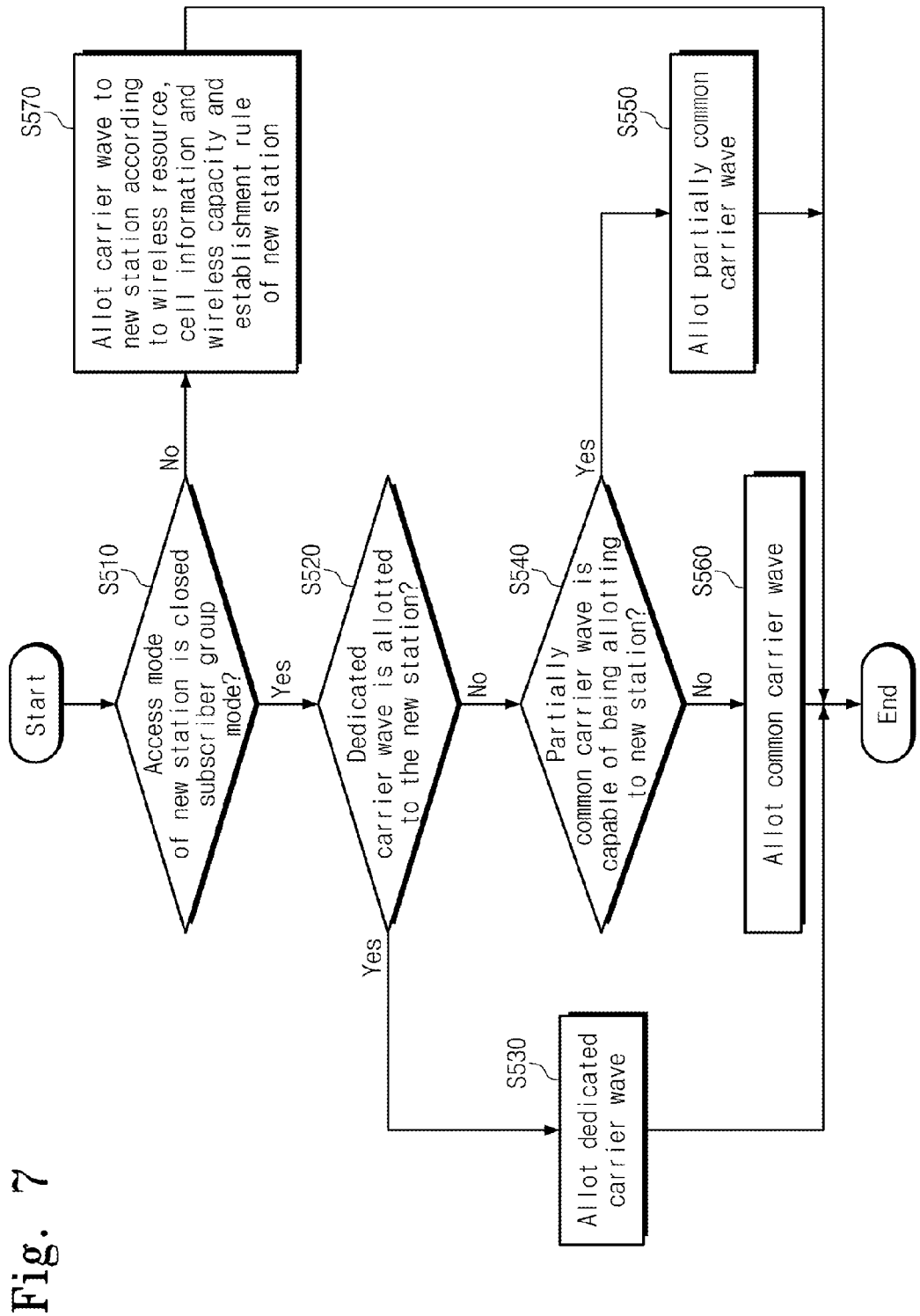
FIG. 7 is a flowchart illustrating a method of allotting a carrier wave to a new station.

FIG. 7 is a flowchart illustrating a method of allotting a carrier wave to a new station. Referring to FIGS. 1 and 7, in operation S510, an operation and maintenance system 150 may judge whether an access mode of a new station is a closed subscriber group (CSG) mode. If so, in operation S520, the operation and maintenance system 150 may judge whether a dedicated carrier wave is allotted to the new station. If a dedicated carrier wave is capable of being allotted to the new station, in operation S530, the operation and maintenance system 150 may allot a dedicated carrier wave to the new station.

If it is impossible to allot a dedicated carrier wave to the new station, that is, a wireless resource capable of allotting a dedicated carrier wave is deficient, the operation and maintenance system 150 may judge whether a partially common carrier wave is capable of being allotting to the new station. If so, in operation S550, the operation and maintenance system 150 may allot a partially common carrier wave to the new station.

If a partially common carrier wave is not capable of being allotting to the new station, that is, a wireless resource capable of allotting a partially common carrier wave is deficient, in operation S560, the operation and maintenance system 150 may allot a common carrier wave to the new station.

As described with reference to FIG. 1, when a station 130 has a closed subscriber group mode, it may affect communication between the user equipment UE2 having no authority and a faraway station 110. If it is possible to allot a dedicated carrier wave to the station 130 having the closed subscriber group mode, the station 130 having the closed subscriber group mode may not affect the user equipment UE2 having no authority. Thus, it is possible to prevent interference by first allotting a dedicated carrier wave to a new station having a closed subscriber group mode.

If a dedicated carrier wave is allotted to a station having a closed subscriber group mode, interference may be generated at a duplicative frequency band of a partially common carrier wave. If a common carrier wave is allotted to a station having a closed subscriber group mode, interference may be generated at the whole frequency band of the common carrier wave. That is, interference of a CSG station to which a common carrier wave is allotted may be larger than that of a CSG station to which a partially common carrier wave is allotted. Thus, interference due to the CSG station may be minimized by allotting a partially common carrier wave to a CSG new station when a dedicated carrier wave is unusable. A common carrier wave may be allotted to a CSG new station when both a dedicated carrier wave and a partially common carrier wave are unusable.

When an access mode of the new station is not a closed subscriber ground (CSG) mode, in operation S700, the operation and maintenance system 150 may allot a carrier wave to the new station according to a wireless resource, cell information and wireless capacity and establishment rule of the new station.

For example, the operation and maintenance system 150 may detect interference-free or interference-less carrier waves and interference-serious carrier waves of carrier waves, based on cell information of stations adjacent to the new station. The operation and maintenance system 150 may allot interference-free or interference-less carrier waves to the new station. The operation and maintenance system 150 may adjust carrier components allotted to the new station according to a wireless capacity of the new station. The operation and maintenance system 150 may allot a dedicated carrier wave, a partially common carrier wave, or a common carrier wave in advance according to an establishment rule. The establishment rule by which the operation and maintenance system 150 allots a carrier wave to a new station may be adjusted and changed according to a communication circumstance of a wireless communication network 100, an object thereof, and the like.

FIG. 8 is a diagram illustrating a resource management table of an operation and maintenance system. Referring to FIG. 8, a resource management table may include a closed subscriber group mode identifier CSG ID, a station identifier, an access mode, a peripheral cell density, a CSG density, a connection terminal number, a usable resource, load information received from a peripheral cell, and an interference indicator.

An operation and maintenance system 150 may judge whether or not a station is a closed subscriber group, based on an access mode corresponding to each station identifier. The operation and maintenance system 150 may calculate an interference indicator by adding a weight to each parameter based on a peripheral cell density via cell information, a closed subscriber group density according to the peripheral cell density, a current connection terminal number, a currently usable carrier wave resource, and interference information (e.g., load information) received from a peripheral cell when the peripheral cell and an interface exist. In the event that the interference indicator is large, the operation and maintenance system 150 may grant the priority of a dedicated channel allotment and interference evasion resource allotment to a corresponding station. In a case where stations belong to the closed subscriber group (CSG) identifier CSG ID, the operation and maintenance system 150 may grant the priority to stations according to an interference level.

Figure 9:
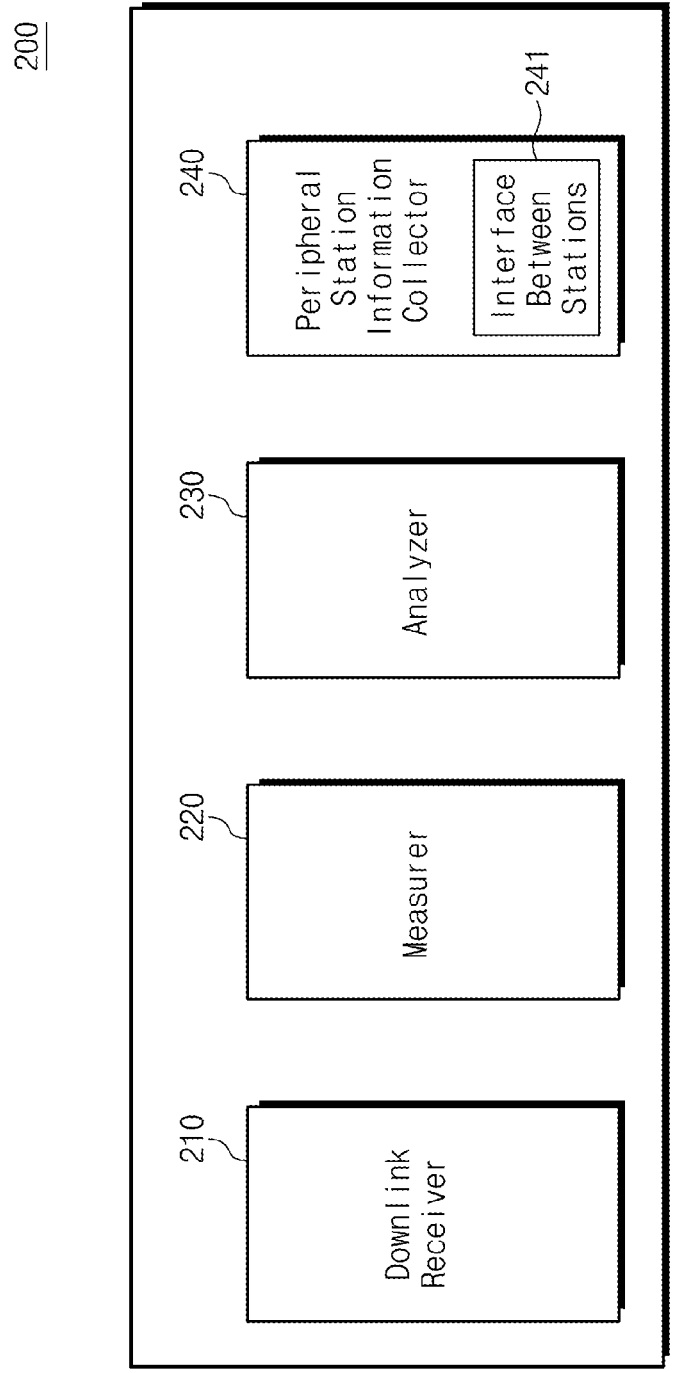
FIG. 9 is a block diagram schematically illustrating an interference measuring unit 220 according to an embodiment of the inventive concept.

FIG. 9 is a block diagram schematically illustrating an interference measuring unit 220 according to an embodiment of the inventive concept. Referring to FIGS. 1 and 9, an interference measuring unit 200 may include a downlink receiver 210, a measurer 220, an analyzer 230, and a peripheral station information collector 240.

The measurer 220 may measure RSRP and RSRQ from signals received through the downlink receiver 210. The analyzer 230 may analyze the RSRQ and RSRP to calculate a variation in the RSRP to the RSRQ.

The peripheral station information collector 240 may include an inter-station interface 241. The peripheral station information collector 240 may perform a load reporting operation using the inter-station interface 241 to measure an interference-associated parameter such as load information.

The interference measuring unit 200 may be provided as a constituent element of each of stations 110, 120, 130, and 140.

In addition to the interference measuring unit 200, the stations 110 to 140 may further perform a function of receiving a channel interference indicator CQI from the user equipment UE1 and UE2.

As described above, the operation and maintenance system 150 according to an embodiment of the inventive concept may allot a dedicated carrier wave, a partially common carrier wave, or a common carrier wave to a new station according to an access mode of a new station and cell information (including an interference indicator) of old stations. Thus, it is possible to provide a carrier wave allotting method capable of reducing interference.

A carrier wave allotting method is described using cases that a carrier wave is allotted to a new station. However, the inventive concept is not limited thereto. For example, a carrier wave of an occupied station can be changed due to load balancing or other causes. In this case, as described with reference to embodiments of the inventive concept, a dedicated carrier wave, a partially common carrier wave, or a common carrier wave may be allotted to a corresponding station using an access mode and cell information of the corresponding station.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method of allotting a carrier wave of an operation and maintenance system in a wireless communication network, the method comprising:
    searching, using a processor, a wireless resource of the wireless communication network;
    updating, using the processor, cell information indicating information of cells of the wireless communication network;
    searching, using the processor, an access mode of a station connected with the operation and maintenance system;
    searching, using the processor, a wireless capacity of the station; and
    allotting, using the processor, a carrier wave to the station according to the wireless resource, the cell information, the access mode, and the wireless capacity.

2. The carrier wave allotting method of claim 1, wherein the updating cell information indicating information of cells of the wireless communication network is performed when the station is connected or periodically although the station is not connected.

3. The carrier wave allotting method of claim 1, wherein the updating cell information indicating information of cells of the wireless communication network comprises updating an interference indicator indicating interference between cells.

4. The carrier wave allotting method of claim 1, wherein the searching an access mode of a station connected with the operation and maintenance system comprises judging whether the station is at an open access mode, a hybrid access mode, or a closed subscriber group mode.

5. The carrier wave allotting method of claim 1, wherein the allotting a carrier wave to the station according to the wireless resource, the cell information, the access mode, and the wireless capacity comprises allotting a dedicated carrier wave not sharing a carrier wave with another cell, a partially sharing carrier wave partially sharing a carrier wave with another cell, or a sharing carrier wave sharing a carrier wave with another cell, to the station.

6. The carrier wave allotting method of claim 5, wherein when the station is at the closed subscriber group mode, the dedicated carrier wave is allotted to the station in preference to the partially sharing carrier wave or the sharing carrier wave and the partially sharing carrier wave is allotted to the station in preference to the sharing carrier wave.

7. The carrier wave allotting method of claim 1, wherein when the station is at an open access mode or a hybrid access mode, a carrier wave is allotted to the station according to the wireless resource, the cell information, the access mode, and the wireless capacity.

8. The carrier wave allotting method of claim 1, wherein the updating cell information indicating information of cells of the wireless communication network comprises:
    generating first cell information and establishing a first weight using an interface existing between stations of the wireless communication network;
    generating second cell information and establishing a second weight using a downlink receiver existing at the stations of the wireless communication network; and
    generating third cell information and establishing a third weight using a channel quality indicator.

9. The carrier wave allotting method of claim 8, wherein the generating second cell information and establishing a second weight using a downlink receiver existing at the stations of the wireless communication network comprises:
    calculating a reference signal received power (RSRP) and a reference signal received quality (RSRQ);
    calculating a variation in the RSRP to the RSRQ; and
    establishing the second weight according to a deviation of an RSRQ-based RSRP deviation.

10. The carrier wave allotting method of claim 8, wherein the generating third cell information and establishing a third weight using a channel quality indicator comprises:
    receiving the channel quality indicator (CQI);
    calculating a variation in a the channel quality indicator to an average of the channel quality indicator; and
    establishing the third weight according to a deviation of a variation in the channel quality indicator based on the average of the channel quality indicator.

* * * * *